United States Patent
Amirijoo et al.

(10) Patent No.: US 8,903,375 B2
(45) Date of Patent: Dec. 2, 2014

(54) COMPENSATING FOR COVERAGE HOLES IN A CELLULAR RADIO SYSTEM

(75) Inventors: Mehdi Amirijoo, Linköping (SE); Fredrik Gunnarsson, Linköping (SE); Johan Moe, Mantorp (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 98 days.

(21) Appl. No.: 13/522,872

(22) PCT Filed: Mar. 29, 2010

(86) PCT No.: PCT/SE2010/050341
§ 371 (c)(1),
(2), (4) Date: Jul. 18, 2012

(87) PCT Pub. No.: WO2011/102767
PCT Pub. Date: Aug. 25, 2011

(65) Prior Publication Data
US 2012/0295611 A1    Nov. 22, 2012

Related U.S. Application Data (60) Provisional application No. 61/305,591, filed on Feb. 18, 2010.

(51) Int. Cl.
*H04W 24/00* (2009.01)
*H04W 52/34* (2009.01)
*H04W 52/14* (2009.01)
*H04W 24/02* (2009.01)
*H04W 52/24* (2009.01)
*H04W 52/22* (2009.01)
*H04W 52/40* (2009.01)
*H04W 28/04* (2009.01)
*H04W 28/18* (2009.01)

(52) U.S. Cl.
CPC ............ *H04W 52/343* (2013.01); *H04W 24/02* (2013.01); *H04W 52/242* (2013.01); *H04W 52/228* (2013.01); *H04W 52/40* (2013.01); *H04W 28/04* (2013.01); *H04W 52/146* (2013.01); *H04W 28/18* (2013.01)
USPC ....... 455/424; 455/63.1; 455/67.16; 455/446; 455/522; 455/69

(58) Field of Classification Search
CPC ...... H04W 24/00; H04W 16/10; H04W 24/02
USPC .................. 455/517, 522, 63.1, 69, 423–425, 455/67.11–67.16, 446–447
See application file for complete search history.

(56) References Cited

U.S. PATENT DOCUMENTS 5,852,778 A     12/1998   Labedz
6,477,376 B1 *  11/2002   Carter ........................ 455/446
(Continued)

FOREIGN PATENT DOCUMENTS

WO     WO 2006/010958     2/2006

OTHER PUBLICATIONS

International Search Report for PCT/SE2010/050341, mailed Jan. 3, 2011.

(Continued)

*Primary Examiner* — Sharad Rampuria (57) ABSTRACT

In a method and a device for automated compensation for a cell/sector outage parameters of uplink power control are adjusted in order to tradeoff coverage versus quality. The uplink power control parameters can be continuously optimized in response to traffic and network characteristics thereby providing for an optimized performance degradation in cells surrounding the coverage hole.

14 Claims, 5 Drawing Sheets

(56) References Cited

U.S. PATENT DOCUMENTS

| | | | |
|---|---|---|---|
| 7,301,926 B1 | 11/2007 | Dietrich et al. | |
| 8,050,629 B2* | 11/2011 | Foster et al. | 455/63.1 |
| 8,095,143 B2* | 1/2012 | Amirijoo et al. | 455/452.1 |
| 8,150,402 B2* | 4/2012 | Panico et al. | 455/446 |
| 8,260,207 B2* | 9/2012 | Srinivasan et al. | 455/63.1 |
| 8,271,014 B2* | 9/2012 | Gholmieh et al. | 455/522 |
| 8,615,266 B2* | 12/2013 | Bonneville et al. | 455/522 |
| 8,670,773 B2* | 3/2014 | Nobukiyo | 455/447 |
| 2006/0165032 A1 | 7/2006 | Hamalainen et al. | |
| 2007/0105581 A1 | 5/2007 | Ariyur | |
| 2008/0214225 A1* | 9/2008 | Choukroun et al. | 455/522 |
| 2011/0130137 A1* | 6/2011 | Sanders et al. | 455/424 |
| 2011/0176497 A1* | 7/2011 | Gopalakrishnan | 370/329 |

OTHER PUBLICATIONS

3GPP TR 36.816; "$3^{rd}$ Generation Partnership Project; Technical Specification Group Radio Access Network; Evolved Universal Terrestrial Radio Access (E-UTRA); Study on Signalling and Procedure for Interference Avoidance for In-Device Coexistense (Release 11)," V11.20, Dec. 2011.

3GPP TS 36.300, "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," V8.2.0, Sep. 2007.

3GPP TS 36.213, "$3^{rd}$ Generation Partnership Project; Technical Specification Group Radio Access Network; Evolved Universal Terrestrial Radio Access (E-UTRA); Physical Layer Procedures (Release 10)," V10.6.0, Jun. 2012.

3GPP TR 32.816 V0.1.1, $3^{rd}$ Generation Partnership Project; Technical Specification Group Services and System Aspects; Telecommunication Management; Study on Management of LTE and SAE (Release 8) (Apr. 2007).

NGMN, "NGMN Use Cases Related to Self Organising Network, Overall Description", A deliverable by the NGMN Alliance, May 31, 2007.

International Preliminary Report on Patentability and Written Opinion issued in PCT/SE2010/050341 dated Aug. 21, 2012.

* cited by examiner

COMPENSATING FOR COVERAGE HOLES IN A CELLULAR RADIO SYSTEM

This application is the U.S. national phase of International Application No. PCT/SE2010/050341, filed 29 Mar. 2010, which designated the U.S. and claims the benefit of U.S. Provisional Application No. 61/305,591, filed 18 Feb. 2010, the entire contents of each of which are hereby incorporated by reference.

TECHNICAL FIELD

The present invention relates to a method and a device for managing a cellular radio system. In particular the present invention relates to a method and a device for automatically compensating for a failure in a cell of a cellular radio system.

BACKGROUND

Figure 1:
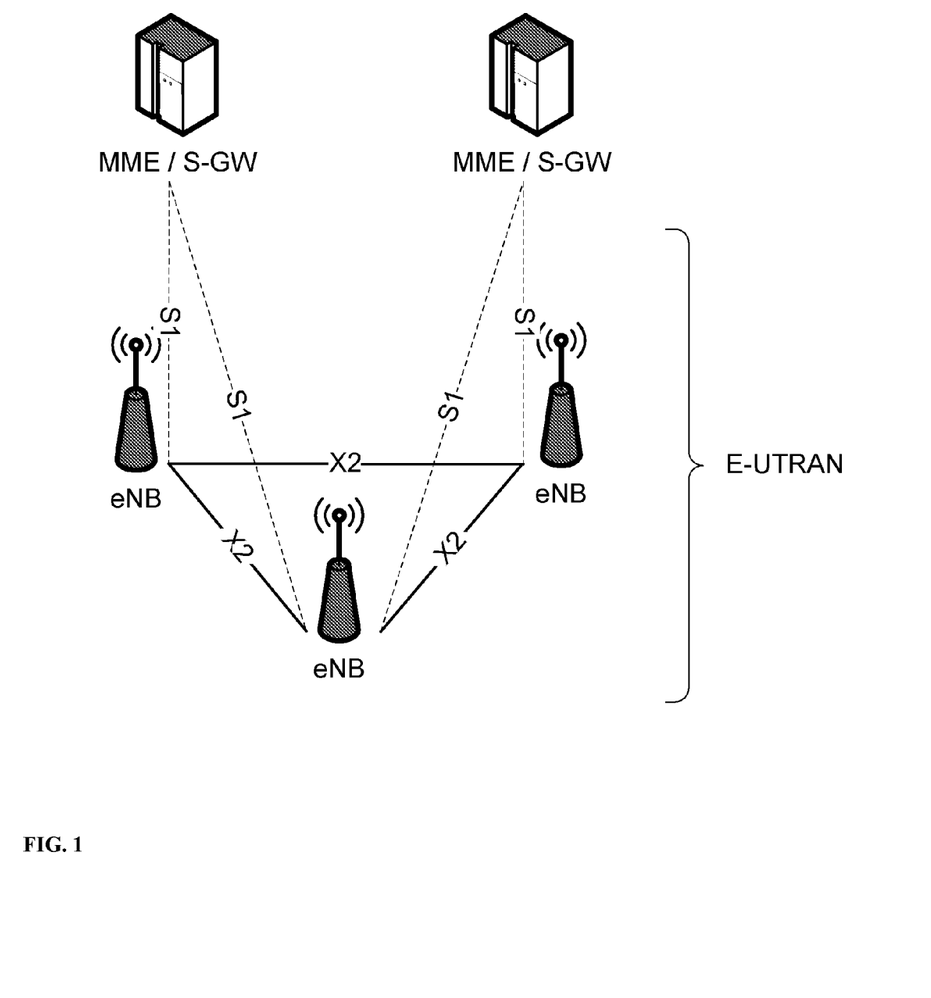
FIG. 1 is a general view of an LTE radio system.

The architecture of a Long Term Evolution (LTE) system is shown in FIG. 1. In LTE the downlink is based on orthogonal frequency division multiplexing (OFDM) while the uplink is based on a single carrier modulation method known as discrete Fourier transform spread OFDM (DFT-S-OFDM, see 3GPP TR 36.300, Evolved Universal Terrestrial Radio Access (E-UTRA) and Evolved Universal Terrestrial Radio Access (E-UTRAN); Overall description; Stage 2, V8.2.0. In FIG. 1 the LTE architecture is shown including the logical interfaces between the radio base stations eNBs (X2) and between eNB and MME/S-GW (S1).

Uplink Power Control Loop in LTE

Typically, in a communication system, e.g., UTRAN and E-UTRAN, an open-loop power control mechanism is used in the uplink. This is also often supplemented with a closed-loop part which is not described herein. A common power control loop employed in communication systems, e.g., LTE see 3GPP TS 36.213. E-UTRA; Physical layer procedures, is given by:

$$PSD = P_0 \times PL^\alpha \ [W/Hz] \quad \text{(Equation 1)}$$

where:
PSD is the power spectral density of the Uplink (UL) transmission
$P_0$ is the desired received power density
PL is the path loss, including shadowing and antenna gains
$\alpha$ is the path loss compensation fraction, where
$\alpha = 1$ gives fair performance with optimum cell edge performance (full path loss compensation)
$\alpha < 1$ trading cell edge performance for higher cell throughput
$P_0$ is a parameter, which can be composed of the sum of a cell specific nominal component and a UE specific component. As such it is possible to adjust $P_0$ for the individual UEs within one cell.

Network Management

Figure 2:
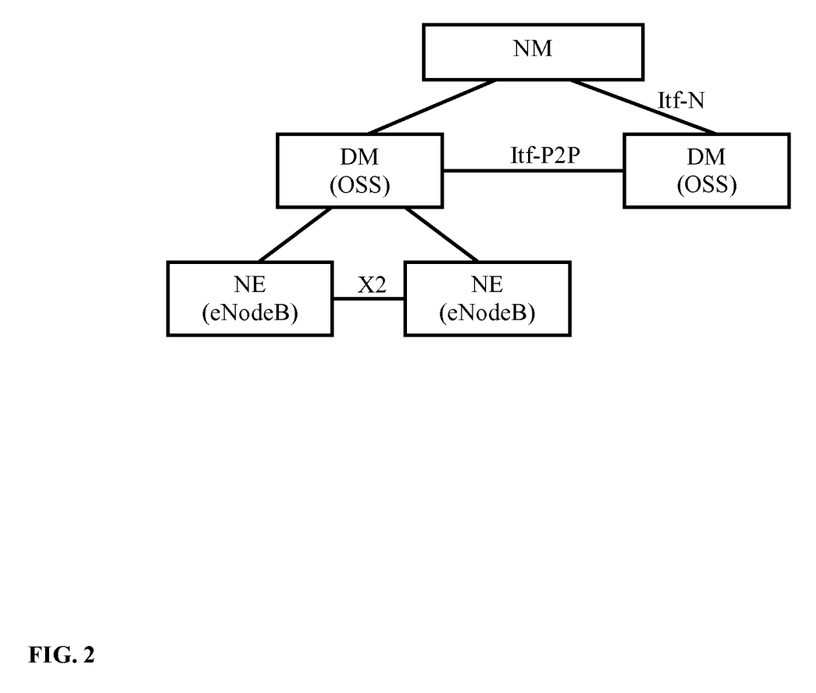
FIG. 2 is a view illustrating a cellular radio system management architecture.

In FIG. 2 an exemplary management system is shown. The node elements (NE), also referred to as eNodeB (E-UTRAN) or NodeB (UTRAN), are managed by a domain manager (DM), also referred to as the operation and support system (OSS). A DM may further be managed by a network manager (NM). Two NEs can be interfaced by X2 in case of E-UTRAN, whereas the interface between two DMs is referred to as Itf-P2P.

A vision in the ongoing Evolved Universal Terrestrial Radio Access Network (E-UTRAN) standardization work is that the new system is self-organizing in as many aspects as possible, see e.g. NGMN, "Operator Use Cases related to Self Organising Networks," ver. 1.53, 2007-04-16 and Third Generation Partnership Project (3GPP) technical Report TR 32.816, Study on Management of E-UTRAN and SAE.

One aspect that benefits from self-organization is automatic cell outage compensation. In current wireless communication systems there are situations when a whole base station or part of the base station (e.g. a sector/cell of a sectorized base station) is in outage due to hardware/software failures. When in outage the cell/base station cannot support any users in its vicinity and if these users cannot connect to another base station in the neighborhood then a coverage hole is created. For the operators of wireless access networks this is an undesirable consequence as potential revenue is missed from the unsupported traffic and also customer satisfaction is damaged.

Common practice today is that the wireless operators aim at repairing the malfunctioning cell/base stations as soon as possible (thereby restoring the original coverage).

As set out above conventional network managements systems can generate coverage "holes" in the event of a cell/sector outage. This is undesired as potential revenue is missed from the unsupported traffic and also customer satisfaction is damaged. This is particularly critical for services with a negotiated quality such as a guaranteed bit rate.

Also U.S. Pat. No. 5,852,778A "Method and system for providing communications service to a coverage hole" describes a communications service to a coverage hole in a DS-CDMA cellular communication system involving an OMC determining the configuration of the transmitters in adjacent cells to the coverage hole. The OMC then selects at least one, but less than all of the transmitters to increase power of a pilot channel.

The method described in U.S. Pat. No. 5,852,778A is gross grained and can cause interference problems. Hence, there exist a need for an improved method and a system that automatically can compensate for an outage in a cellular radio system.

SUMMARY

It is an object of the present invention to overcome or at least reduce some of the problems described above.

This object and others are obtained by the method and device as described herein and as set out in the independent claims. Thus, by adjusting parameters of uplink power control in order to tradeoff coverage versus quality, improved methods and devices for compensating for a coverage hole, which can result from a cell/sector outage are provided. The uplink power control parameters can be continuously optimized in response to traffic and network characteristics thereby providing for an optimized performance degradation in cells surrounding the coverage hole.

In accordance with one embodiment a method for automated compensation of a cell/sector outage is provided. Upon determination of a cell/sector outage uplink power control parameters are adjusted in an area in the vicinity of the cell/sector in outage.

In accordance with one embodiment the adjusted uplink control parameters are one or many of the desired received power density and/or the pathloss compensation fraction; or a parameter corresponding to the desired received power density and/or the pathloss compensation fraction.

In accordance with one embodiment a list of cells to adjust the power control parameters in, is determined by simulations, or measurements of the number of times user equipments report a certain neighbor and/or information regarding the strength of this particular neighbor, and/or a rate of handovers to a certain neighbor.

In accordance with one embodiment the desired received power density is computed as a function of observed uplink and downlink quality over a time window, outage target uplink and downlink quality, current and historical power density values, and an allowed power density power value range.

In accordance with one embodiment the outage compensation is triggered by a network manager node or a domain manager node, and where cells are instructed to participate in a compensation or supporting network by the network manager node or the domain manager node.

In accordance with one embodiment the outage compensation is triggered by a radio base station.

In accordance with one embodiment the outage compensation is based on an operator policy governing the actions taken when adjusting uplink power control parameters.

In accordance with one embodiment a device for automated compensation of a cell/sector outage is provided. The device can comprise means for determining a cell/sector outage means for adjusting uplink power control parameters in an area in the vicinity of the cell/sector in outage upon determining the cell/sector outage. The adjusted uplink control parameters can be one or many of the desired received power density for all or a subset of user equipments in the cell/sector and/or the pathloss compensation fraction for all or a subset of user equipments in the cell/sector; or a parameter corresponding to the desired received power density for all or a subset of user equipments in the cell/sector and/or the pathloss compensation fraction for all or a subset of user equipments in the cell/sector.

In accordance with one embodiment the device further comprising means for determining a list of cells, to adjust the power control parameters in, by receiving measurements of the number of times user equipments report a neighbor and/or information regarding the strength of this particular neighbor, and/or a rate of handovers to a certain neighbor.

In accordance with one embodiment the device further comprises means for computing the desired received power density as a function of observed uplink and downlink quality over a time window, outage target uplink and downlink quality, current and historical power density values, and an allowed power density power value range.

In accordance with one embodiment the device, when outage compensation is triggered by a network manager node or a domain manager node, is further configured to instruct cells to participate in a compensation or supporting network by transmitting a message from the network manager node or the domain manager node.

In accordance with one embodiment the device, when outage compensation is triggered by a radio base station, is further configured to instruct cells to participate in a compensation or supporting network by transmitting a message from the radio base station.

In accordance with one embodiment the device further comprises means for basing the outage compensation on an operator policy governing the actions taken when adjusting uplink power control parameters.

The invention also extends to a device for controlling parameters of uplink power control in accordance with the methods described herein. The device can be computer implemented by a micro processor operating on a set of computer program instructions stored on a memory of the device. Execution of the computer program instructions causes the device to perform the different steps of the methods.

The method and device can be used in the field of automated mitigation of the negative effects from cell and/or base station outage (e.g. due to hardware/software failure) via compensation actions from the neighboring cells. In particular a method and a device for modifying uplink power control parameters are provided such that coverage and quality, in terms of UE throughput and/or service quality in general, is balanced according to an operator policy.

BRIEF DESCRIPTION OF THE DRAWINGS

The present invention will now be described in more detail by way of non-limiting examples and with reference to the accompanying drawings, in which.

DETAILED DESCRIPTION

A main goal of cell outage management is to minimize the network performance degradation when a cell is in outage through quick detection and compensation measures. This is performed by automatic adjustment of network parameters in surrounding cells in order to meet the operator's performance requirements based on coverage and other quality indicators, e.g., throughput, to the largest possible extent.

Altering the radio parameters of the neighboring cells means that some of the user equipments (UEs) served by those cells may be affected. This should be taken into account and an appropriate balance between the quality/coverage offered to the outage area and the unavoidable performance degradation experienced in the surrounding cells, should be achieved. This balance can be controlled and enforced by means of an operator policy that governs the actions taken by the cell outage compensation function.

Below the quality Q, is defined in terms of end user perceived quality, e.g., $10^{th}$-percentile of User Equipment (UE) throughput. The quality term also encompasses the negotiated service quality for admitted users, which for example can correspond to a guaranteed bit rate or a guaranteed latency over some time. In this context, some users may be best effort users in the sense that the perceived quality and service experience depend on the available resources without any guarantees. The quality Q can also mean the fraction of the users that meet the negotiated service quality.

In accordance with the present invention uplink power control parameters are adjusted in response to an outage in a cell of a cellular radio system to compensate for the hole created by the outage. Below a radio base station eNodeB or its sectors that is not operational is referred to as an outage cell.

In accordance with one embodiment uplink power control parameters, such as, $P_0$ and a in equation 1 above, are adjusted in the vicinity of the radio base station (eNodeB) or sector(s) in outage, in order to decrease the uplink inter-cell interference and thereby to increase the uplink Signal to interference and Noise Ratio (SINR) for the UEs in the outage area which are power-limited.

In accordance with one embodiment $P_0$ and $\alpha$ are tuned in response to receiving information of a neighboring outage cell. Hereby the uplink coverage is improved and as such the outage area resulting from the cell outage can decrease in size. Each cell in the vicinity of outage cell(s) can be adapted to continuously measure quality indicators, e.g., $10^{th}$-percentile of the downlink and uplink throughput, or fulfillment of negotiated service quality, and adjusts $P_0$ and a such that the quality indicator is equal to or above a certain threshold which can be referred to as the outage target quality. In case of negotiated services, the outage target quality can be either complete fulfillment of the negotiated service quality or a fraction of the services.

In accordance with one embodiment let $Q_{DL}$ and $Q_{UL}$ denote the quality in the DL and UL, respectively. Assume further that each cell has an outage target quality $Q_{T,DL}$ for the downlink and $Q_{T,UL}$ for the uplink, which may be defined in terms of UE throughput, e.g. $10^{th}$-percentile UE throughput or fulfillment of negotiated service quality or some other suitable definition. Essentially, the following must hold during an outage $Q_{DL} \geq Q_{T,DL}$ and $Q_{DL} \geq Q_{T,UL}$. As a result the coverage is maximized under the constraints that the quality indicator is greater or equal to the specified outage target quality.

Below some additional detailed examples are given

Compensating and Supporting Cells

Figure 3:
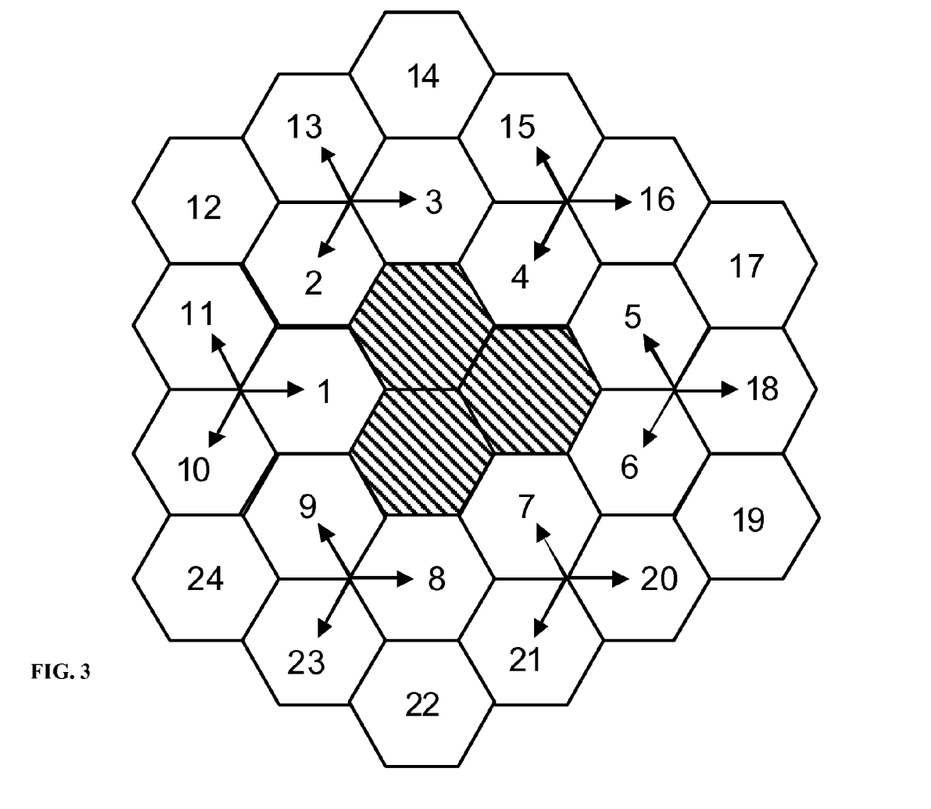
FIG. 3 is a view illustrating a compensation and supporting network for cells in outage.

First, refer to the cells C, which are best capable of providing coverage over the area previously served by the outage cells, as the compensating cells. An example is given in FIG. 3. In FIG. 3 an outage area is shown by the striped area in the middle. In this example, the compensating cells can be selected to be cells 1, 4, and 7. Another example would be cells 1-9.

The determination of the compensating cells can be made using a multitude of different approaches, some of which include:

Simulation or predictions

Network measurements, e.g., Handover (HO) rates

UE reports, e.g., Reference Signal Received Power (RSRP) and Reference Signal Received Quality (RSRQ)

For example, each UE will report a neighbor that has sufficient high quality and which may serve as a candidate for HO. By measuring the number of times the UEs report a certain neighbor as well as including information regarding the strength of this particular neighbor (using e.g., RSRP or RSRQ measurements), a list of candidate neighbors, to participate in the compensating cells, can be determined. Further, by considering other network-oriented mobility measurements, e.g. HO rate, the suitability of a neighbor can be established. Further, supporting cells S can be defined as the strongest neighbors of the cells C. The cells S can be determined using the same method that is used for determining the cells C for the outage cell. For example, if the compensating cells C are cells 1, 4, and 7, then the supporting cells are cells 10, 11, 2, 3, 15, 16, 5, 6, 20, 21, 8, and 9.

Computing $P_0$

Generic Approach

By altering $P_0$ the quality in each cell is changed. In general, decreasing $P_0$ results in a decrease in quality and vice versa. The basic approach works as follows and is executed for each cell in the vicinity of the outage cells. The uplink quality and downlink quality in each cell are continuously measured, whereby $P_0$ is decreased under the constraint that $$(Q_{DL} > Q_{T,DL}) \text{ AND } (Q_{UL} > Q_{T,UL}) \text{ AND } (P_0 > P_{0,min})$$

where $P_{0,min}$ is the minimum tolerable $P_0$.

There are several ways of setting $P_0$ such that above specified constraint is satisfied. One example embodiment is as follows:

If $Q_{DL} > Q_{T,DL}$ AND $Q_{UL} > Q_{T,DL}$ then $$P_0(k) = \max(P_{0,min}, P_0(k-1)-d)$$

else $$P_0(k) = \min(P_{0,max}, P_0(k-1)+d)$$

where d is the step by which $P_0$ is decreased or increased. Further $P_{0,max}$ is the maximum $P_0$ that is allowed.

In general, $P_0$ can be computed as a function of observed uplink and downlink quality over a time window, outage target uplink and downlink quality, current and historical $P_0$ values, and an allowed $P_0$ value range $[P_{0,min}, P_{0,max}]$.

In accordance with one embodiment, the set of cells where $P_0$ is adjusted includes at least the supporting cells S. Hereby it is possible to decrease the uplink inter-cell interference to the compensating cells C and, thus, increasing the ability of C to cover the area in outage. Further, $P_0$ in the compensating cells C can also be adapted as described above.

Scope of $P_0$

As described above $P_0$ typically constitutes of a cell specific nominal component and a UE specific component. By altering the cell specific nominal component all UEs in the cell are affected. Assume that the cell specific nominal component of $P_0$ is reduced in a supporting cell. This means that also UEs that have a relatively high path loss to a compensating cell reduce their uplink transmit power density. This can potentially have a negative impact on the quality, as UEs with high path loss to the compensating cell will not generate significant uplink inter-cell interference to the compensating cell.

In accordance with one embodiment the system makes use of UE-reports (e.g. RSRP measurements) to identify the UEs in a supporting cell that are close (have a relatively low path loss) to a compensating cell C. These identified UEs will generate significant uplink inter-cell interference to the compensating cell C. Only the $P_0$ of these identified UEs are adjusted and other UEs that have a relatively high path loss to the compensating cell C are controlled to maintain their $P_0$ or not reduce their $P_0$ as much.

Setting Minimum $P_0$

The parameter $P_{0,min}$ can be set such that the uplink SINR is sufficient for establishing a basic connection with the network. The parameter $P_{0,min}$ can for example be determined such that:

The UL SINR is higher or equal to a threshold which supports the lowest Modulation and Coding Scheme (MCS), and/or A minimum bit rate can be obtained In one embodiment, the parameter $P_{0,min}$ is based on the UL SINR as follows. Let $SINR_{min}$ be the minimum tolerable UL SINR, based on e.g., the lowest MCS. The received signal power S at the base station must thus satisfy $$S \geq SINR_{min} \times (N_0 + I_{max})$$

where $I_{max}$ is the maximum UL inter-cell interference that can be observed. Above gives that $$P_0 \geq SINR_{min} \times (N_0 + I_{max})$$

The parameter $I_{max}$ can be obtained using different methods, e.g., based on historic measurements of inter-cell interference, and/or simulations and/or predictions, and/or predictions of future traffic variations Further, $I_{max}$ can include a margin for unforeseen increases in inter-cell interference. It is obvious that different methods can be applied for basing $I_{max}$ on historic measurements. On such way is to find the maximum UL inter-cell interference during the last X minutes/hours/days. The historic measurements can also be based on different times of the day. For example, the load and as such the inter-cell interference may be higher in the middle of the day compared to night time.

It is noted that a changed inter-cell characteristics can occur when altering $P_0$. Since $P_0$ is decreased and, as such, the UL inter-cell interference is also decreased, then the observed (historic) $I_{max}$ will typically be greater than the inter-cell interference obtained with lower $P_0$ during an outage. As such this overestimation will typically not cause any problems. However, in accordance with one embodiment, $I_{max}$ can be adjusted. This can for example be based on the relation between the pre-outage $P_0$ and the current $P_0$.

Computing Alpha

The power control loop given above also contains a fractional path loss component governed by α, which enables trading off cell edge throughput versus cell throughput or capacity. The inter-cell interference in the vicinity of the outage cells can be decreased by lowering a in the supporting cells. This reduces the inter-cell interference to the compensating cells and provides higher capability for the compensating cells to cover the area in outage.

Signaling for Cell Outage Compensation

The cell outage compensation can be triggered by a suitable network node, for example a network manager (NM) node or a domain manager (DM) node. A triggering event can cause such a node to signal to the cells concerned and the cells can be instructed to participate in the compensation or in the supporting network by the NM or DM. Further, the tuning of $P_0$ and alpha can also be performed in a network node such as a NM or DM. In this case necessary measurements, e.g., quality and inter-cell interference can be to be sent over the Itf-N interface.

In accordance with another embodiment, a radio base station, e.g. eNodeB, can be configured to during nominal operation, i.e., when there are no outages, identify its compensation network by using for example UE or network measurements. Once a the radio base station associated with a first cell has identified its compensation network it informs each second cell in its compensation network, through e.g. the X2 interface, that if an outage occurs then the second cells in the compensating network are to start compensating for the outage. This means that the second cells start compensating when they have detected that the first cell is in outage. Each second cell in the compensation network then informs the third cells in the supporting network to also participate in the compensation. Again this can be done using for example the X2 interface.

In yet another embodiment, when the first cell is in outage, the first base station which serves the first cell maintains X2 communication to other cells. Thereby, the first base station can upon detection of the first cell outage signal to the second cells in the compensation network to start compensating. Again, each second cell in the compensation network then informs the third cells in the supporting network to also participate in the compensation.

Figure 4:
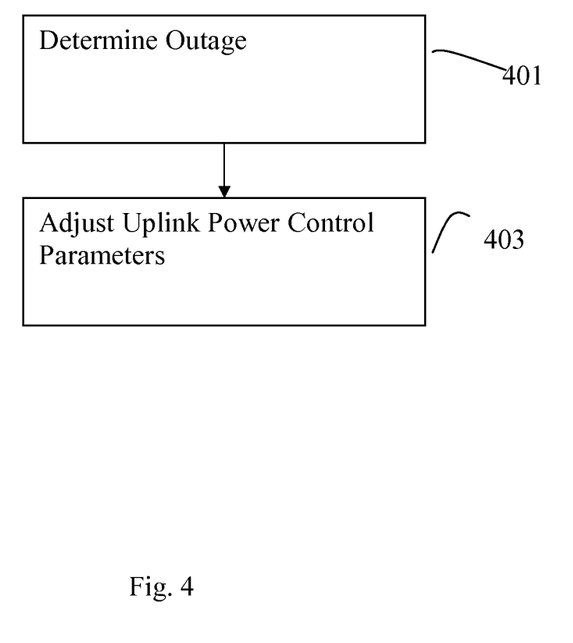
FIG. 4 is a view illustrating some procedural steps performed when compensating for an outage.

FIG. 4 is a flowchart illustrating some procedural steps performed during automated compensation of a cell/sector outage. First, in a step 401, it is determined that a cell/sector outage exists. Next, in a step 403, uplink power control parameters in an area in the vicinity of the cell/sector in outage are adjusted to compensate for the outage detected in step 401.

Figure 5:
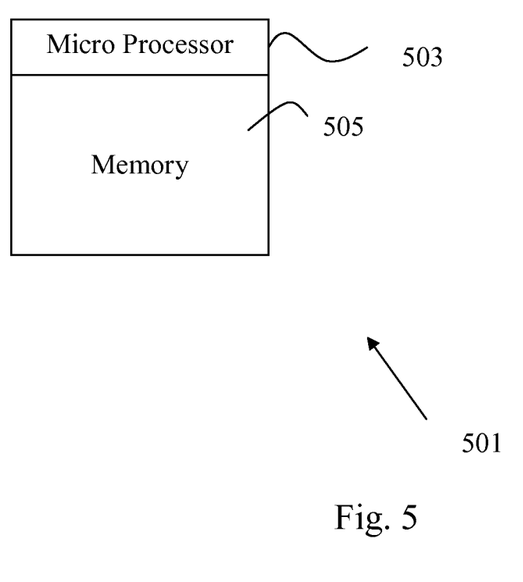
FIG. 5 is a view of a device for compensation for an outage.

FIG. 5 is a view of a device 501 for performing automated compensation of a cell/sector outage. The device comprises a micro processor 503 operating on a set of computer program instructions stored on a memory 505 of the device. Execution of the computer program instructions causes the device to perform the different steps of the methods described herein. In particular the computer program instructions can cause the device to adjust uplink power control parameters in an area in the vicinity of a cell/sector in outage to compensate for outage.

The device 501 can be integrated in or collocated with any suitable radio system node. In particular the device 501 can be integrated in or collocated with a node elements (NE), also referred to as eNodeB, a domain manager (DM), also referred to as the operation and support system (OSS), or a network manager (NM).

Using the methods and devices as described herein provides for very little or no human intervention when compensating for outages, and a shorter response time and faster reaction to outages. Overall, the result is an improved network performance with less user dissatisfaction and a less in revenue loss. Also, while the invention has been described in the context of an E-UTRAN system, the invention can be applied in other cellular radio systems as well, for example in an UTRAN system.

The invention claimed is:

1. A method for automated compensation of a cell/sector outage, the method comprising the steps of:
    determining a cell/sector outage,
    upon determining the cell/sector outage, for one or more user equipments served by a compensating cell outside of a cell/sector in outage but in an area in the vicinity of the cell/sector in outage, adjusting uplink power control parameters to decrease uplink inter-cell interference and to increase the uplink Signal to Interference and Noise Ratio (SINR) for a user equipment in the cell/sector in outage.

2. The method according to claim 1, wherein the adjusted uplink control parameters comprise one or both of the desired received power density and pathloss compensation fraction for the one or more user equipments in the compensating cell; or a parameter corresponding to the desired received power density and/or the pathloss compensation fraction for the one or more user equipments in the compensating cell.

3. The method according to claim 1, wherein a list of cells, to adjust the power control parameters in, is determined by simulations, or measurements of the number of times user equipments report a certain neighbor and/or information regarding the strength of this particular neighbor, and/or a rate of handovers to a certain neighbor.

4. The method according to claim 2, wherein the desired received power density is computed as a function of observed uplink and downlink quality over a time window, outage target uplink and downlink quality, current and historical power density values, and an allowed power density power value range.

5. The method according to claim 1, wherein outage compensation is triggered by a network manager node or a domain manager node, and where cells are instructed to participate in a compensation or supporting network by the network manager node or the domain manager node.

6. The method according to claim 1, wherein outage compensation is triggered by a radio base station.

7. The method according to claim 1, wherein outage compensation is based on an operator policy governing the actions taken when adjusting uplink power control parameters.

8. A device for automated compensation of a cell/sector outage, the device comprising:
 means for determining a cell/sector outage,
 means for adjusting, upon determining the cell/sector outage, uplink power control parameters, for one or more user equipments served by a compensating cell outside of a cell/sector in outage but in an area in the vicinity of the cell/sector in outage to decrease uplink inter-cell interface and to increase the uplink Signal to Interface and Noise Ratio (SINR) for a user equipment in the cell/sector in outage.

9. The device according to claim 8, wherein the adjusted uplink control parameters comprise one or both of the desired received power density comprise one or both and the pathloss compensation fraction the one or more user equipments in the cell; or a parameter corresponding to the desired received power density and/or the pathloss compensation fraction for the one or more user equipments in the compensating cell.

10. The device according to claim 8, further comprising means for determining a list of cells, to adjust the power control parameters in, by receiving measurements of the number of times user equipments report a neighbor and/or information regarding the strength of this particular neighbor, and/or a rate of handovers to a certain neighbor.

11. The device according to claim 8, further comprising means for computing the desired received power density as a function of observed uplink and downlink quality over a time window, outage target uplink and downlink quality, current and historical power density values, and an allowed power density power value range.

12. The device according to claim 8, when outage compensation is triggered by a network manager node or a domain manager node, the device further being configured to instruct cells to participate in a compensation or supporting network by transmitting a message from the network manager node or the domain manager node.

13. The device according to claim 8, when outage compensation is triggered by a radio base station, the device further being configured to instruct cells to participate in a compensation or supporting network by transmitting a message from the radio base station.

14. The device according to claim 8, further comprising means for basing the outage compensation on an operator policy governing the actions taken when adjusting uplink power control parameters.

* * * * *

UNITED STATES PATENT AND TRADEMARK OFFICE
CERTIFICATE OF CORRECTION

PATENT NO.        : 8,903,375 B2
APPLICATION NO.   : 13/522872
DATED             : December 2, 2014
INVENTOR(S)       : Amirijoo et al.

Page 1 of 1

It is certified that error appears in the above-identified patent and that said Letters Patent is hereby corrected as shown below:

In the Specification

In Column 4, Line 62, delete "a" and insert -- $\alpha$ --, therefor.

In Column 5, Line 8, delete "a" and insert -- $\alpha$ --, therefor.

In Column 6, Line 4, delete "$Q_{UL} > Q_{T,DL}$" and insert -- $Q_{UL} > Q_{T,UL}$ --, therefor.

Signed and Sealed this
Fourteenth Day of July, 2015

Michelle K. Lee
*Director of the United States Patent and Trademark Office*